Nov. 19, 1963 W. H. ENGEL 3,111,052
ENDLESS CHAIN TOOL CARRIER ASSOCIATED WITH
PRODUCT REMOVAL MEANS
Filed March 18, 1959 7 Sheets-Sheet 1

INVENTOR
William H. Engel.
BY
Mason, Porter, Diller & Stewart
ATTORNEYS

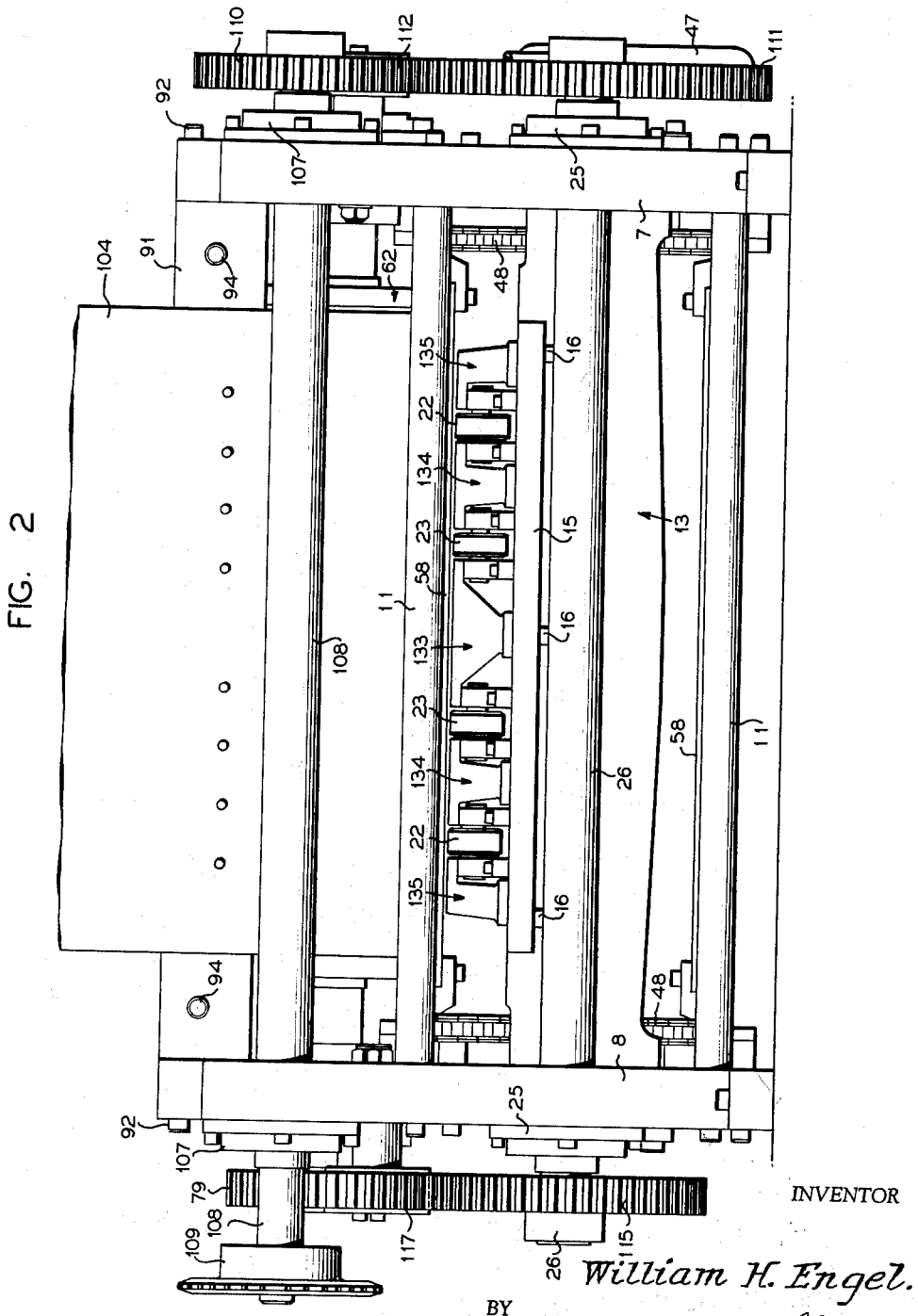

Nov. 19, 1963   W. H. ENGEL   3,111,052
ENDLESS CHAIN TOOL CARRIER ASSOCIATED WITH
PRODUCT REMOVAL MEANS
Filed March 18, 1959   7 Sheets-Sheet 3

FIG. 3

INVENTOR
William H. Engel.
BY
Mason, Porter, Diller & Stewart
ATTORNEYS

INVENTOR
William H. Engel.
BY
Mason, Porter, Diller & Stewart
ATTORNEYS

United States Patent Office 3,111,052
Patented Nov. 19, 1963

3,111,052
ENDLESS CHAIN TOOL CARRIER ASSOCIATED WITH PRODUCT REMOVAL MEANS
William H. Engel, Mount Vernon, Ohio, assignor to Continental Can Company, Inc., New York, N.Y., a corporation of New York
Filed Mar. 18, 1959, Ser. No. 800,298
6 Claims. (Cl. 83—100)

The invention relates generally to the art of cutting openings in material and primarily seeks to provide a novel machine for cutting holes in paper and pliable plastic materials ranging in thickness from a thin film to approximately 1/16 inch.

In the past, hole cutting has been performed in numerous different ways. These include a ball and a female die wherein the ball is spring loaded away from the female die and a cam or lever is engaged with the ball to urge the ball down on the material to be cut with the result that the ball, in cooperation with the female die, crush cuts the material. This method and apparatus is limited as to the thickness of material and the number of layers or sheets of material which may be cut.

Another method of hole cutting utilizes a rotary die cutting against a hardened surface or platen roll. Although this method produces a satisfactory cut, the method is prohibitively costly due to the fact the cutting die must be ground to the proper circumferential diameter. Inasmuch as the cutting edge of the die is disposed along a curved surface, the grinding operation is a time-consuming and thus costly operation.

Still another method of hole cutting utilizes a male die and a female die with the two dies cooperating to perform a cutting operation while the material to be cut is stationary. This method of cutting holes is limited to materials of heavy weight stock and will not cut materials such as polyethylene, Saran and other light weight materials.

In view of the foregoing, it is the primary object of this invention to provide a hole cutting machine for cutting holes in paper and pliable plastic materials, which machine is of a relatively inexpensive construction which will cut a wide range of materials and thickness of such materials.

Another object of the present invention is to provide a machine for cutting holes in materials, such as pliable plastics and paper products, wherein the material is cut between a hardened platen roll and a die, the die being of a tubular construction of such a nature whereby it may be inexpensively machined in a lathe.

Still another object of the invention is to provide a hole cutting machine which will form clean-cut holes in either single or multiple sheets without the material being cut clinging to the die or the sheets clinging to each other after the material has been cut, the hole cutting machine employing a rotating platen roll and a die, the die being so mounted whereby it opposes the platen roll during the cutting operation and moves at the same rate of speed and in the same direction as the cooperating surface of the platen roll.

A further object of the invention is to provide a hole cutting machine wherein the cooperating cutting elements include a rotating platen roll and a moving die, the hole cutting machine including supports for the platen roll and the moving die wherein at the time the cutting operation is performed, the die is contiguous to the platen roll but without pressure contact so that damage to the die by contact with the platen roll is prevented and sharpening of the die is required only to eliminate dullness due to wear resulting from the cutting engagement of the die with the material being cut.

Another object of the invention is to provide a machine particularly adapted for cutting holes in material fed in the form of a continuous web, the machine including a platen roll mounted for rotation and an endless conveyor having a run passing said platen roll in parallel relation thereto, the endless conveyor including a plurality of die supports which, in turn, carry the necessary hole cutting dies, the machine also including a roller type support for each of the support bars at the time the dies of the individual support bars are opposed to the platen roll whereby the dies are supported against movement radially of the platen roll during the pressure contact of the dies with the material being cut so that the optimum cutting relationship between the dies and the platen roll is maintained.

A further object of the invention is to provide a hole cutting machine wherein holes are cut in material through the use of a platen roll and cooperating dies having opposed surfaces moving in like directions and at like speeds, the hole cutting machine having waste disposal means including the tubular construction of the dies wherein material cut by the dies may pass through the dies immediately subsequent to the time the material is cut, the hole cutting machine having suction heads so positioned relative to the platen roll whereby at such time as the dies are in cutting cooperative relation with the platen roll, the suction heads are aligned with the dies to remove the cut material through the dies.

A still further object of this invention is to provide a novel die assembly for a hole cutting machine, the die assembly including a die support carried by an endless conveyor for movement adjacent to a platen roll, and a plurality of individual dies seated in the die support, the dies being identical and of a nature whereby they may be cheaply produced in quantity in a lathe or screw machine, the dies being adjustably secured to the support bar whereby, through adjustment, cutting edges of the dies may be disposed in coplanar relation.

With the above, and other objects in view that will hereinafter appear, the nature of the invention will be more clearly understood by reference to the following detailed description, the appended claims and the several views illustrated in the accompanying drawing:

In the drawing:

FIGURE 2 is an end view of the hole cutting machine, as viewed from the right in FIGURE 1.

FIGURE 3 is a side elevational view of the opposite side of the hole cutting machine from FIGURE 1.

FIGURE 9 is an enlarged fragmentary sectional view showing a modified form of die construction.

Figure 5:
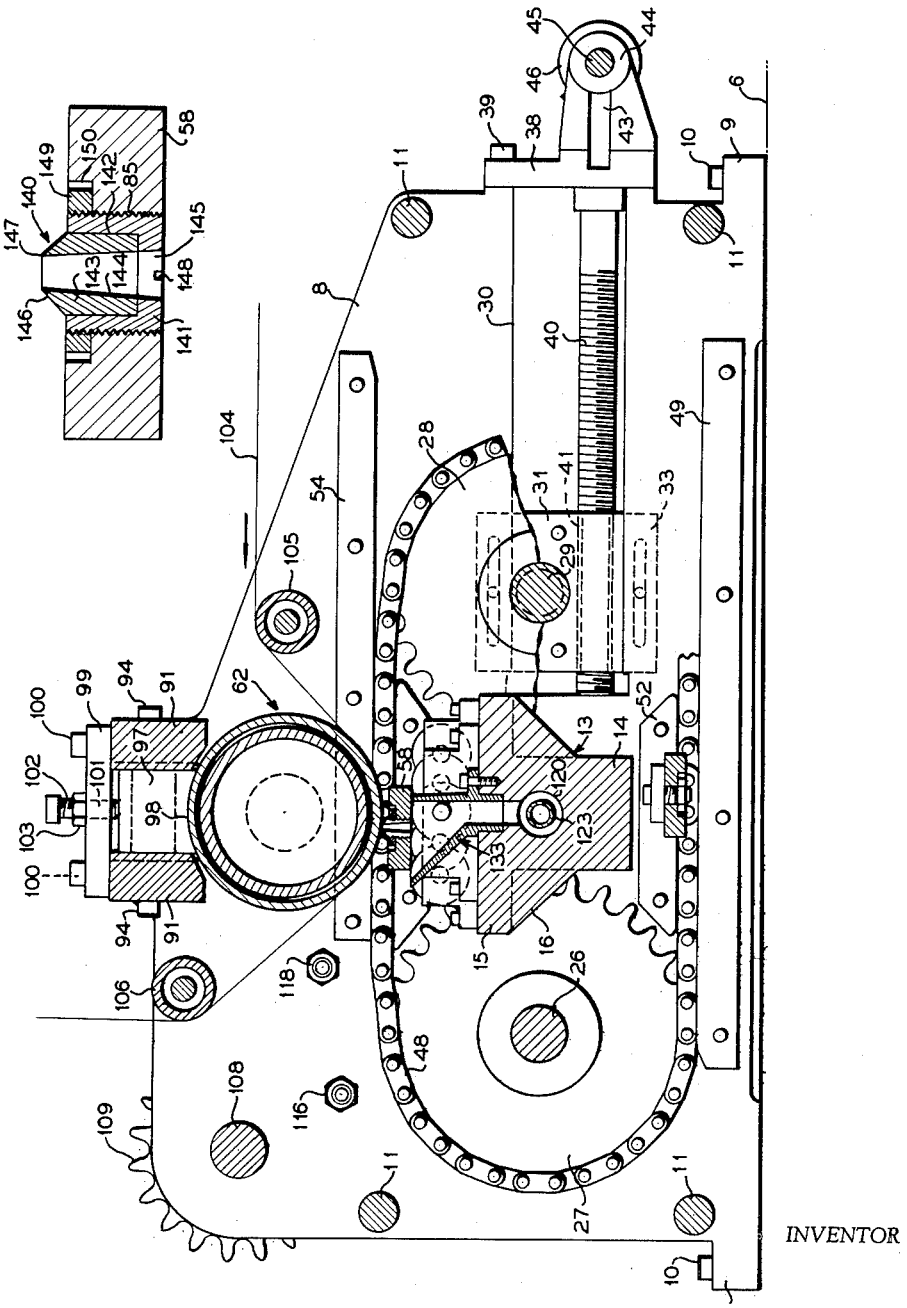
FIGURE 5 is a longitudinal vertical sectional view taken along the line 5—5 of FIGURE 4 and shows the internal construction of the machine.

In the example of embodiment of the invention herein disclosed, 5 designates in general the hole cutting machine which is illustrated as being mounted on a suitable base 6. The hole cutting machine 5 includes a frame formed of a pair of side frames 7 and 8. The side frames 7 and 8 are formed of relatively thick plate material and are provided at the lower ends thereof with projecting ears 9 through which hold-down bolts 10 pass, the hold-down bolts 10 being anchored in the base 6. The side frames 7 and 8 are maintained in spaced parallel relation by means of a plurality of tie rods 11 whose positions are best illustrated in FIGURE 5. The tie rods 11 are secured to the side frames 7 and 8 by means of cap screws 12 which are passed through the side frames 7 and 8 and threaded into the ends of the tie rods 11.

Extending between the central portions of the side frames 7 and 8 is a die cutting support bar 13. The die cutting support bar is generally T-shaped in cross-section and includes a relatively thick vertical stem 14 and a horizontal upper flange 15. The horizontal upper flange 15 is reinforced at intervals spaced along the length of the die cutting support bar by means of integral gussets 16. The die cutting support bar 13 is secured to the side frames 7 and 8 by means of cap screws 17.

Figure 6:
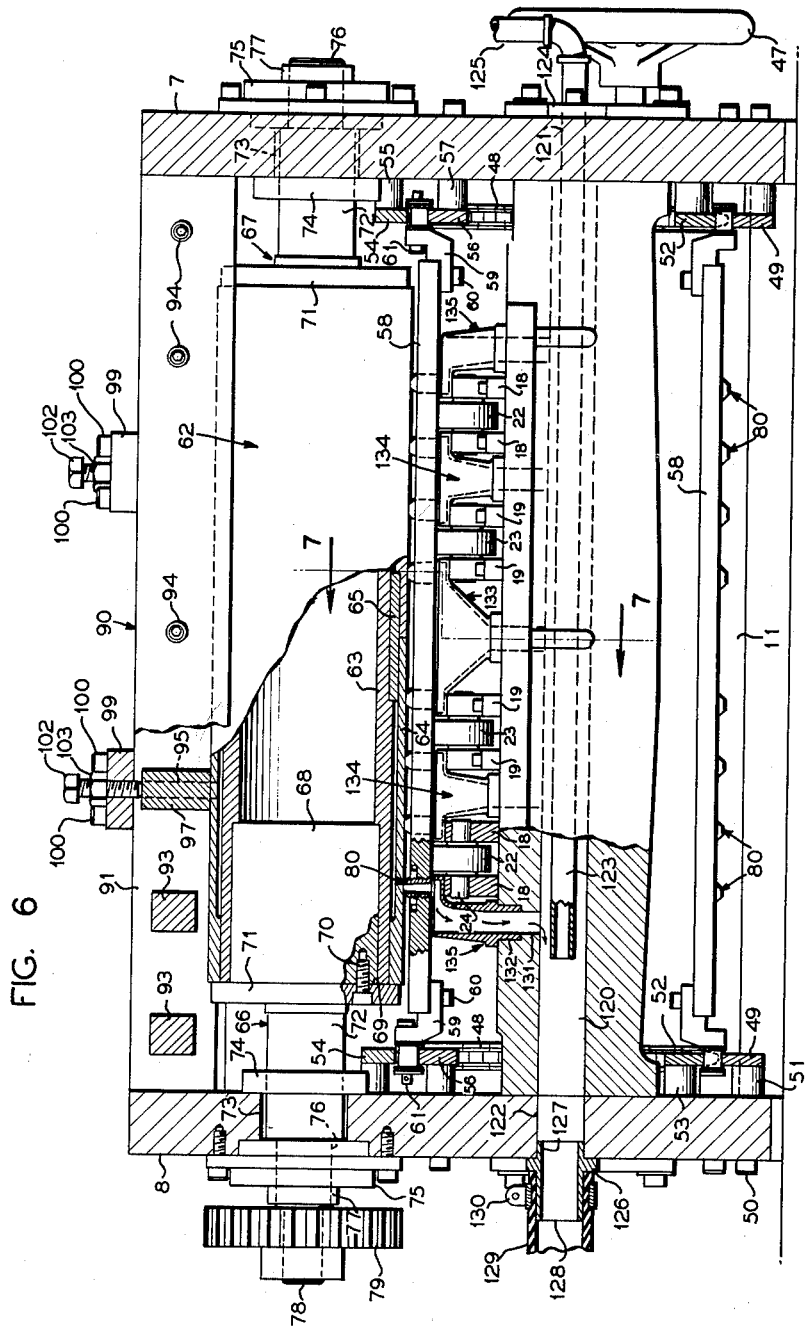
FIGURE 6 is a transverse vertical sectional view taken along the line 6—6 of FIGURE 3 with a portion of the platen roll broken away and shown in section to illustrate the details of construction thereof.
Figure 7:
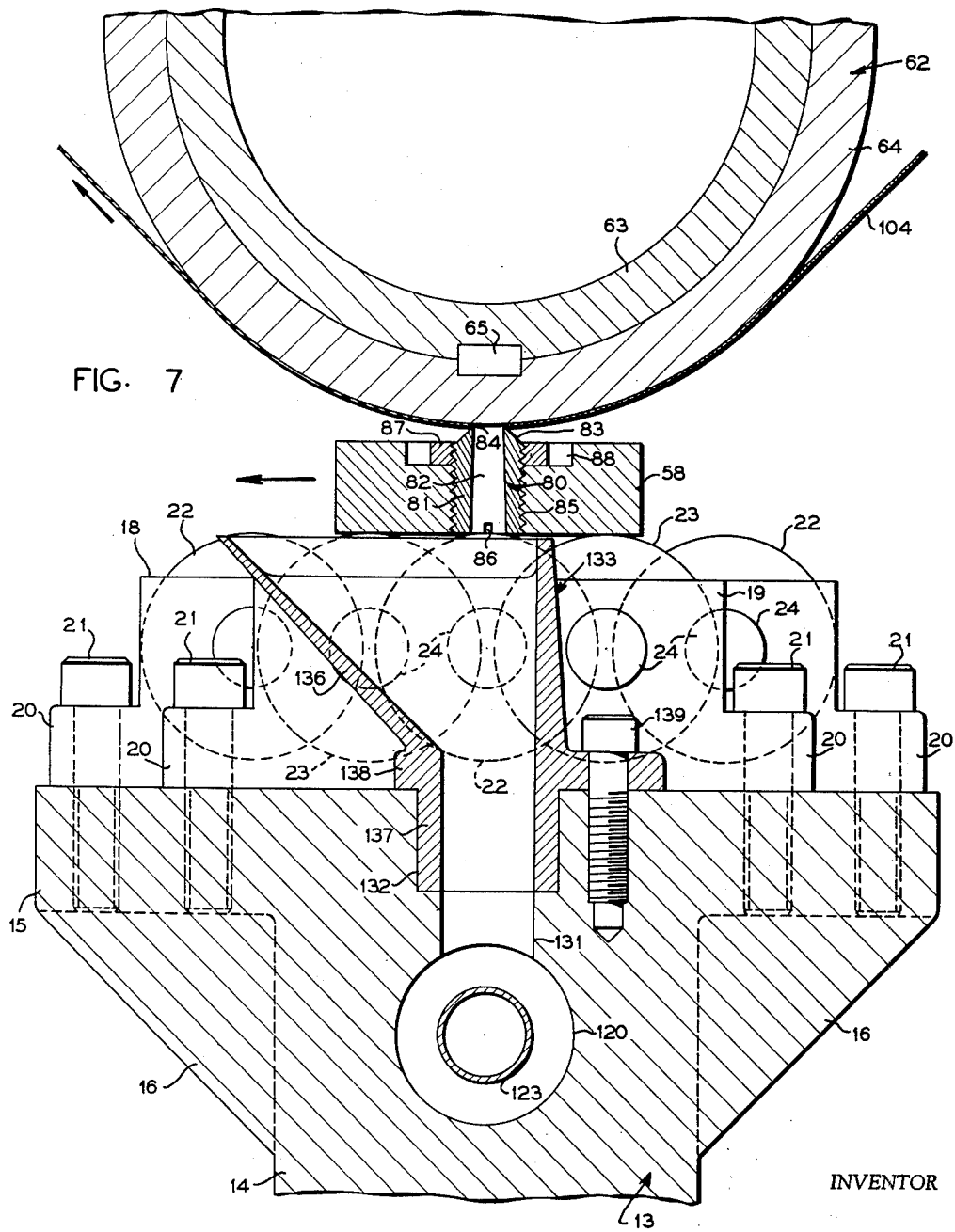
FIGURE 7 is an enlarged fragmentary longitudinal vertical sectional view taken along the line 7—7 of FIGURE 6 and shows the specific manner in which a die is removably carried by a support bar.

With reference to FIGURES 6 and 7, secured to the upper surface of the flange 15 and extending transversely of the die cutting support bar 13 are two outer pairs of support bars 18 and two inner pairs of support bars 19. The support bars 18 are longer than the support bars 19 (FIGURE 7) and each of the support bars 18 and 19 is provided at the ends thereof with projecting ears 20 through which there are passed fasteners 21 which are threadedly engaged in the flange 15. Each pair of the support bars 18 supports three rollers 22, whereas each pair of support bars 19 supports two rollers 23. Each of the rollers 22 and 23 is carried by an axle 24 extending between the support bars of its respective pair of support bars. As is clearly shown in FIGURE 7, the rollers 23 are staggered with respect to the rollers 22.

Secured to the outer faces of the side frames 7 and 8 adjacent the left ends thereof, as viewed in FIGURE 5, are bearing assemblies 25. Extending through the side frames 8 and rotatably journaled in the bearing assemblies is a shaft 26. The shaft 26 has mounted thereon, adjacent to, but spaced from the inner surface of each of the side frames 7 and 8, sprockets 27. A second pair of sprockets 28 are spaced to the right of the sprockets 27 (FIGURE 5) and are aligned with the sprockets 27. The sprockets 28 are carried by an idler shaft 29.

Figures 1, 8:
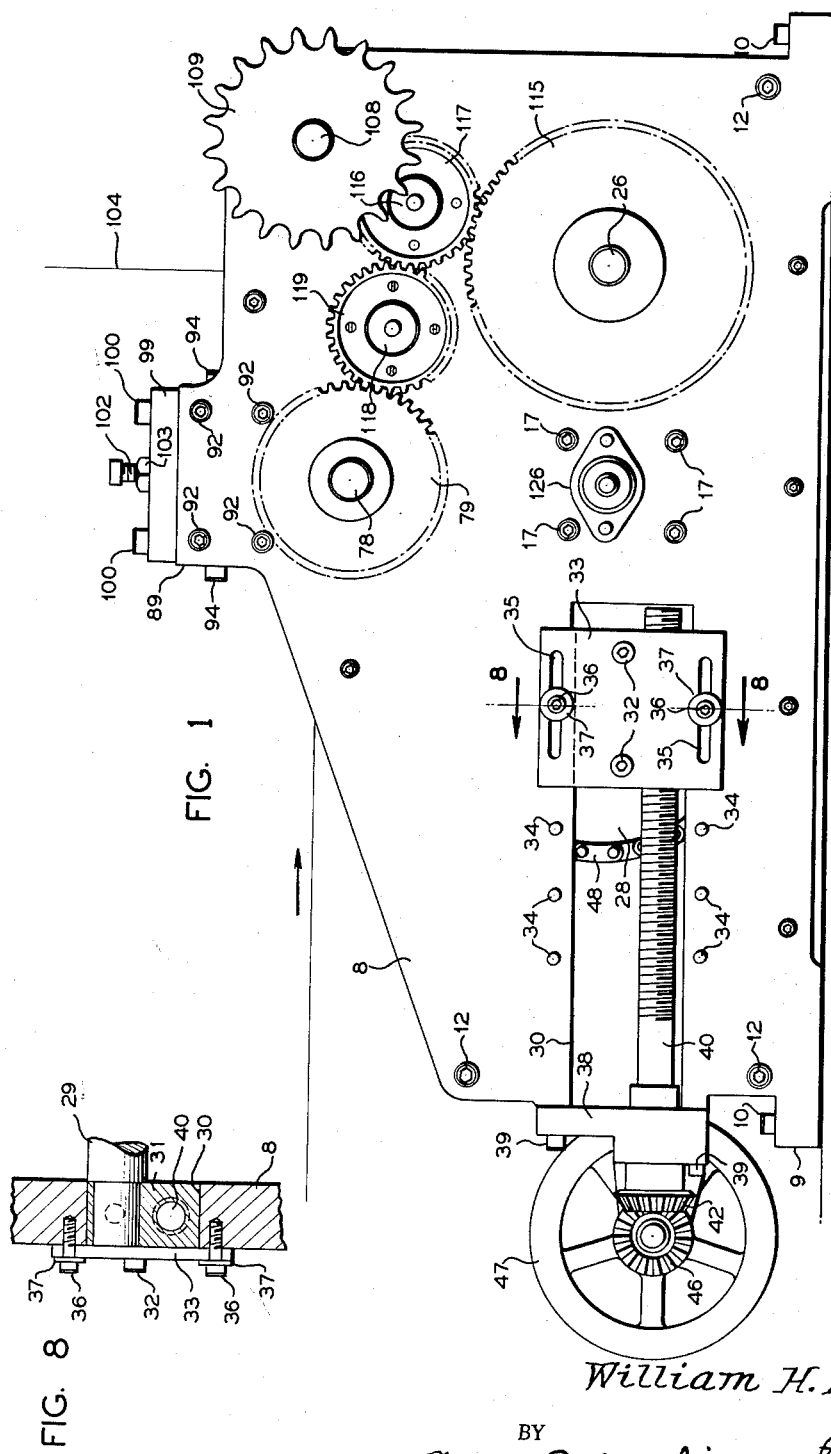
FIGURE 1 is a side elevational view of the hole cutting machine, the direction of feed of the web through the machine being from left to right.
FIGURE 8 is a fragmentary vertical sectional view taken along the line 8—8 of FIGURE 1 and shows the details of mounting of the idler shaft for the endless conveyor.

Referring to FIGURE 1 in particular, it will be seen that each of the side frames 7 and 8 is provided with an elongated horizontal slot 30 which opens through the left end thereof, as viewed in FIGURE 1. Seated in each of the slots 30 for longitudinal adjustment is a bearing block 31, the ends of the idler shaft 29 being rotatably journaled in the bearing blocks 31. The bearing blocks 31 are secured by means of cap screws 32 to mounting plates 33.

Each of the side frames 7 and 8 has formed therein above and below the slot 30 thereof rows of internally threaded bores 34. Secured to the outer surface of each of the side frames 7 and 8 is one of the mounting plates 33. Each mounting plate 33 has formed in the upper and lower part thereof an elongated slot 35 in which there is positioned a cap screw 36 threadedly engaged in one of the bores 34 and having an enlarged washer 37 bearing against the plate 33. In this manner, the mounting plates 33 may be adjusted longitudinally of the side frames 7 and 8.

The slot 30 of each of the side frames 7 and 8 is closed by a mounting block 38. Each mounting block 38 is secured to the ends of its respective side frame by means of a pair of fasteners 39. Rotatably journaled in each of the mounting blocks 38 and extending longitudinally through the slot 30 associated with the mounting block 38 is an elongated feed screw 40 which passes through and is threadedly engaged in an internally threaded bore in an associated one of the bearing blocks 31. The opposite end of each of the feed screws 40 is provided with a bevel gear 42.

Figure 4:
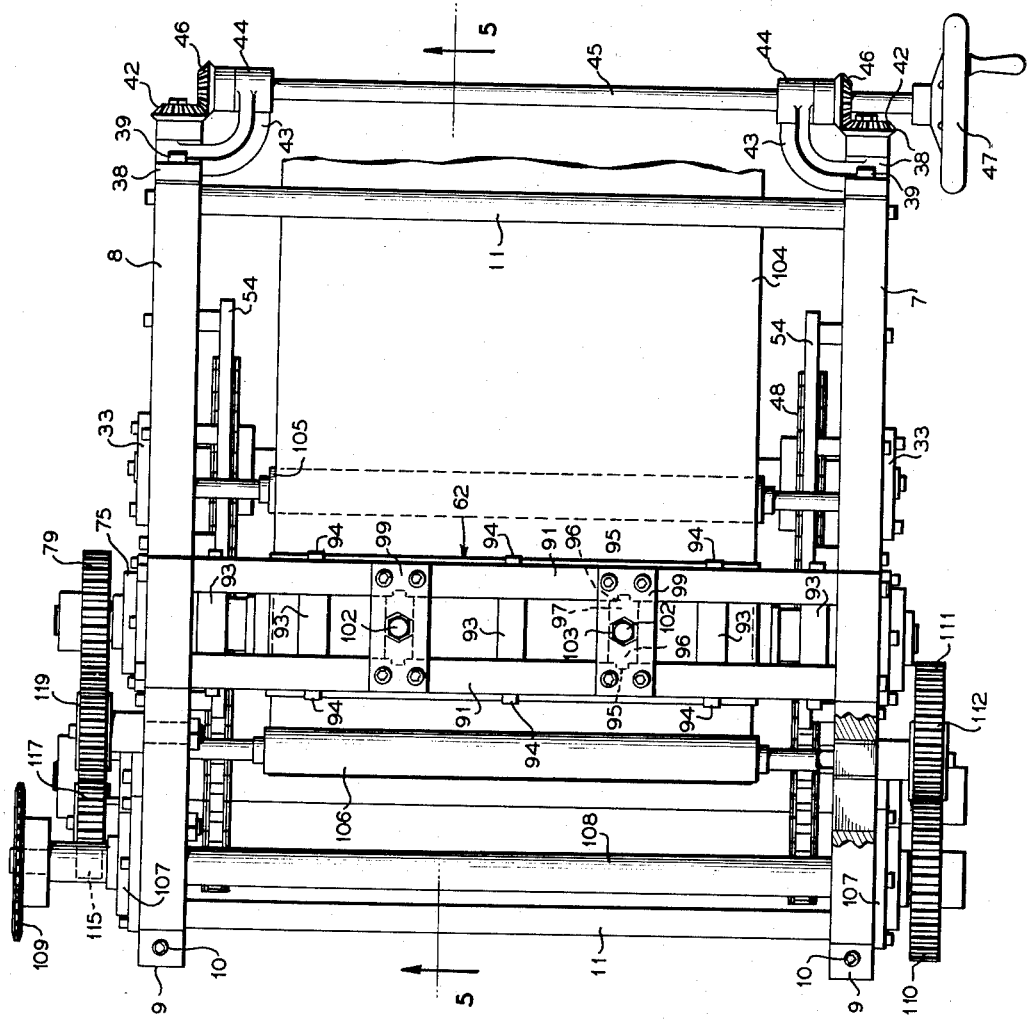
FIGURE 4 is a plan view of the hole cutting machine.

Referring now to FIGURE 4 in particular, there is illustrated secured to each of the mounting blocks 38 a curved arm 43 which terminates in a bearing block 44 disposed at right angles to the feed screws 40. The bearing blocks 44 are aligned and have journaled therein an elongated shaft 45 which extends transversely of the hole cutting machine 5. The shaft 45 is provided with a pair of bevel gears 46 which are meshed with the bevel gears 42. Secured to one end of the shaft 45 is a hand wheel 47 through which the shaft 45 may be rotated so as to turn the feed screws 40.

Entrained over the sprockets 27 and 28 are chains 48. The chains 48 are tensioned by sliding the mounting plates 33 along the side frames 7 and 8 utilizing the feed screws 40. Normally, the desired adjustment may be made by loosening the cap screws 36 and permitting the mounting plates 33 to be shifted to the necessary positions. On the other hand, when it is desired to vary the length of the chains 48, it may be necessary to shift the positions of the mounting plates 33. This is accomplished by removing the cap screws 36, rotating the feed screws 40 so as to move the mounting plates 33 to the new positions, replacing the cap screws 36 in others of the threaded bores 34, and then making the final adjustment in the positions of the mounting plates 33 to obtain the necessary tension in the chains 48.

Reference is now made to FIGURE 5 wherein there are illustrated the details of guide bars for the chains 48. Secured to the lower part of each of the side frames 7 and 8 is a lower bottom chain guide bar 49, the chain guide bar 49 being secured in place by means of fasteners 50 and aligned with the bottom run of the chain 48 with which it is associated by means of spacers 51. Cooperating with the chain guide bar 49 is an upper bottom chain guide bar 52 which directly underlies the die cutting support bar 13. The chain guide bar 52 is aligned with the chain guide bar 49 and is spaced from the side frames 7 and 8 by means of spacers 53.

Overlying the upper part of each of the chains 48 is an upper top chain guide bar 54 which is secured to a respective one of the side frames 7 and 8 in spaced relation thereto utilizing spacers 55. The chain guide bars 54 are relatively long. Underlying the chain guide bars 54 are relatively short lower top chain guide bars 56 which are aligned with the die cutting support bar 13. The chain guide bars 56 are spaced from the side frames 7 and 8 by means of spacers 57 and cooperate with the chain guide bars 54 to support the top runs of the chains 48.

The chains 48 support a plurality of die support bars 58 which extend between the chains 48. While only two die support bars 58 have been illustrated, it is to be understood that the number of such die support bars may be varied as is desired for the particular hole pattern. The die support bars 58 are secured to the individual links of the chains 48 by means of mounting brackets 59 which are generally L-shaped and which are secured to the die support bars 58 at the ends thereof by means of fasteners 60 and to the links of the chains 48 by means of pins 61. It is to be noted that the relationship between the die support bars 58 and the chains 48 is such that as the die support bars 58 move along the top runs of the chains 48, the undersurfaces of the die support bars will ride on the rollers 22 and 23. The rollers 22 and 23 are staggered with respect to each other, and it will be readily apparent that the die support bars 58 will be properly supported by the rollers 22 and 23 at all times.

A platen roll 62 is disposed above and is in alignment with the die cutting support bar 13. The platen roll 62 is of a composite construction and includes an elongated inner sleeve 63. The inner sleeve 63 has telescoped thereover two outer sleeves 64, the combined length of which is substantially equal to the length of the inner sleeve 63. The outer sleeve is keyed to the inner sleeve by means of a key 65 which projects into the opposed ends of the two outer sleeves 64. The platen roll also includes a pair of ends 66 and 67. Each of the platen roll ends 66 and 67 includes a plug 68 which is telescoped in an end of the inner sleeve 63 and secured thereto as by welding 69. Removably secured to the plug 69 by means of circumferentially spaced fasteners 70 is a circular flange 71. The flange 71 has integrally connected thereto a shaft portion 72 which extends through an opening 73 in a respective one of the side frames 7 and 8. Carried by each of the shaft portions 72 adjacent the inner surface of its respective one of the side frames 7 and 8 is a collar 74.

Secured to the outer portion of each of the side frames 7 and 8 in alignment with the opening 73 is a bearing assembly 75. Rotatably journaled in each of the bearing assemblies is a reduced shaft portion 76 which forms a continuation of the shaft portion 72. The shaft portions 76 are positioned with respect to their bearing assemblies 75 by means of collars 77. The platen roll end 66 differs from the platen roll end 67 in that the shaft portion 76 thereof is provided with a reduced extension 78 on which there is secured a drive gear 79.

Reference is now had to FIGURE 7. As is clearly illustrated in that figure of the drawings, the platen roll 62 is so mounted whereby it is spaced above a die support bar 58 when the die support bar is resting on the rollers 22 and 23. However, carried by each of the die support bars 58 and spaced longitudinally of the length of the die support bar is a plurality of dies 80. Each of the dies 80 includes an elongated tubular body 81 having a bore 82 therethrough. The upper end of the tubular body 81 is beveled as at 83 to form a sharp cutting edge 84. It is to be noted that the bore 82 is tapered and has a maximum diameter at the bottom of the tubular body 81.

For each of the dies 80, each die support bar 58 is provided with an internally threaded bore 85. Each die 80 is threaded in its respective bore 85 to a position adjusted relative to the die support bar 58. The threading of the die 80 is accomplished by means of a screwdriver slot 86 in the lower end thereof. The die 80 is retained in an adjusted position with respect to the die support bar 58 by means of a lock nut 87 which is threaded on the upper part of the die 80 and is seated in a recess 88 in the upper surface of the die support bar 58. When the die 80 is properly adjusted, the cutting edge 84 thereof will be contiguous to the platen roll 62 with there being a zero clearance between the two.

Each of the side frames 7 and 8 has an upwardly projecting central portion 89, as is clearly shown in FIGURE 1. Extending between and supported by the central portions 89 is a top support unit 90 for the platen roll 62. The top support unit 90 includes a pair of spaced parallel bars 91 which are vertically disposed and are on opposite sides of the center of the platen roll 62. The bars 91 are secured to the side frames 7 and 8 by means of fasteners 92. The bars 91 are maintained in their spaced apart parallel relation by means of a plurality of spacers 93 (FIGURE 4) which extend between the bars 91 and which are secured to the bars 91 by means of fasteners 94.

Formed in the opposed faces of the bars 91 at approximately the third points thereof are vertically disposed keyways 95 in which there are positioned vertical ribs 96 of bearing blocks 97. The undersides of the bearing blocks 97 are recessed as at 98 to conform to the outer surface of the platen roll 62. The bearing blocks 97 are preferably formed of bronze or other type of hardened bearing material.

Overlying each of the bearing blocks 97 are short bars 99 which are secured to the bars 91 by means of fasteners 100. The bars 99 have internally threaded bores 101 in which there is threaded a set screw 102 extending through the bar 99. The set screw 102 of each of the bars 99 bears against the upper end of an associated one of the bearing blocks 97 and prevents upward movement of the bearing blocks 97. The set screw 102 is held in an adjusted position by means of a lock nut 103. Since the bearing blocks 97 bear against the upper surface of the platen roll 62, upward deflection of the platen roll 62 during a hole cutting operation is prevented.

The material in which holes are to be formed is fed into the hole cutting machine 5 in the form of a continuous web 104. The web 104 may be driven in any desired manner and is positioned relative to the platen roll 62 by means of guide rollers 105 and 106. It is to be noted that the guide rollers are disposed above the bottom of the platen roll 62 so that the web 104 conforms to the shape of the lower portion of the platen roll 62 during the hole cutting operation.

Secured to the outer surface of each of the side frames 7 and 8 adjacent the upper left hand corner thereof, as viewed in FIGURE 3, is a bearing assembly 107. Extending through the side frames 7 and 8 and rotatably journaled in the bearing assemblies 107 is a drive shaft 108.

The drive shaft 108 extends a considerable distance beyond the side frame 8 and has mounted thereon a drive sprocket 109. The drive sprocket 109 will be connected to a suitable drive unit (not shown) which will rotate the drive shaft 108 in timed relation to the feeding of the web 104. The opposite end of the drive shaft 108 has mounted thereon a drive gear 110. The drive gear 110, as is best shown in FIGURE 3, is aligned with, but spaced from a gear 111 secured to the shaft 26 for driving the shaft 26. Disposed intermediate the gears 110 and 111 is an intermediate gear 112 which is meshed with both of the gears 110 and 111. The intermediate gear 112 is a swing gear in order to vary the drive ratio between the drive shaft 108 and the shaft 26. Accordingly, the gear 112 is mounted on a stub shaft 113 which passes through an arcuate slot 114 in the side frame 7 and is adjustably secured to the side frame 7.

Referring now to FIGURE 1, it will be seen that the end of the shaft 26 disposed adjacent the side frame 8 is provided with a gear 115. The gear 115 is aligned with, but spaced from the gear 79. Carried by the side frame 8 is a first stub shaft 116 on which there is mounted an intermediate gear 117 which is meshed with the gear 115. A second stub shaft 118 is carried by the side frame 8 intermediate the gears 79 and 117. Carried by the stub shaft 118 is a second intermediate gear 119 which is meshed with both the intermediate gear 117 and the gear 79 so as to drive the platen roll 62.

The hole cutting machine 5 also includes means for disposing of the waste material removed during the hole cutting operation. These means include a bore 120 extending through the die cutting support bar 13. Formed in the side frames 7 aligned with the bore 120 is a reduced cross-sectional bore 121. A second bore 122 is formed in the side frame 8 in alignment with the bore 120, the bore 122 being of the same diameter as the bore 120. Extending through the bore 121 and projecting a major portion of the distance through the bore 120 is a compressed air supply pipe 123. The compressed air supply pipe 123 is secured to the side frame 7 by means of a fitting 124 and has connected thereto a compressed air supply line 125 which may be connected to any suitable compressed air source (not shown).

Secured to the side frame 8 is an exhaust fitting 126 having a tubular portion 127 projecting into the bore 122. A second tubular portion 128 extends outwardly and has secured thereto an exhaust line 129, the exhaust line 129 being secured to the tubular portion 128 by means of a clamp 130.

The waste material discharge means is of the aspirator type, and extending through the flange 15 of the die cutting support bar is a plurality of vertical bores 131 which open at their lower ends into the bore 120. Each of the bores 131 includes an enlarged upper portion 132. It is to be noted that the compressed air supply pipe 123 extends to the left of the furthermost bore 131 (FIGURE 6). As compressed air is forced through the compressed air supply pipe 123 and as such compressed air is fed into the left end of the bore 120, a suction is formed in the right portion of the bore 120 to form a suction through the bores 131.

Supported by the die cutting support bar 13 intermediate the rollers 23 is a central waste receptacle 133. Disposed intermediate the two sets of rollers 22 and 23 are intermediate waste receptacles 134. Disposed outside of the rollers 22 are end waste receptacles 135. With particular reference to FIGURE 7, it will be seen that there are illustrated the details of the central waste receptacle 133. The central waste receptacle 133 is typical of the waste receptacles 133, 134 and 135, these waste receptacles differing from each other only in the details of an upper funnel portion thereof. The central waste receptacle 133 is intended to receive the waste material from all dies 80 intermediate the rollers 23, and has an upper funnel portion 136 configurated to receive such waste material. Also, it is to be noted that the funnel portion 136 extends from a position underlying the platen roll 62 in the same direction as the direction of movement of the die support bar 58 so that all waste material cut from the web 104 is certain to drop into the funnel portion 136.

The lower part of the central waste receptacle 133 is in the form of a tubular member 137 which is received in the enlarged upper portion of its respective bore 131. The tubular member 137 has an upper mounting flange 138 which is disposed at the intersection between the tubular member 137 and the funnel portion 136. The mounting flange 138 is provided with a fastener 139 which is threadedly engaged into the die cutting support bar 13 so as to hold the central waste receptacle 133 in place. As pointed out above, the constructions of the intermediate waste receptacles 134 and the end waste receptacles 135 are similar to that of the central waste receptacle 133. Accordingly, further description of the intermediate waste receptacles and the end waste receptacles is believed to be unnecessary.

Reference is now had to FIGURE 9 wherein there is illustrated a modified form of die construction. The die 80 has been replaced in the support bar 58 by means of a die referred to in general by the numeral 140. The die 140 includes a sleeve type die support 141 which is externally threaded and which is threadedly engaged into the bore 85 of the die support bar 58. The die support 141 has formed in the upper part thereof a socket 142 in which there is seated a die element 143. There is a press fit between the die element 143 and the die support 141 which permits the removal and replacement of the die element per se when desired. The die elements 143 is of a tubular construction and has a tapered bore 144 therethrough, the bore 144 being of a larger diameter at the bottom than at the top. The die support 141 also has a tapered bore 145 in the lower part thereof which forms a continuation of the bore 144. The upper end of the die element 143 is beveled, as at 146, so as to define an upper cutting edge 147. The die 140 is positioned relative to the die support bar 58 by turning the die support 141 through the use of a screwdriver slot 148 formed in the bottom thereof. The die support 141 is retained in an adjusted position within the die support 58 by means of a lock nut 149 which is seated in a recess 150 formed in the upper part of the die support bar.

Considering the dies 80 and 140, inasmuch as each of the dies is of a tubular construction, the cutting edges 84 and 147 thereof may be readily formed in a lathe or screw machine at a very low cost. The die element 143 in particular is very inexpensive to manufacture, and both of the dies eliminate the heretofore excessive cost of grinding a compound curve.

Operation

When it is desired to cut holes in a material, such as the web 104, the desired number of die support bars 58 and the desired arrangement of dies, either the dies 80 or the dies 140, are incorporated in the hole cutting machine 5 to provide for the desired design. The desired web 104 is then threaded through the hole cutting machine 5 in the manner best shown in FIGURE 5. Since the cutting edges of the die have a zero clearance with the platen roll, no adjustment of the dies is necessary even though the material of the web 104 may be varied. For example, the web may be in the form of cardboard having a thickness of 0.0625 inch or may be in the form of a metalized Mylar stock having a thickness of 0.0005 inch.

After the web 104 has been fed into the hole cutting machine 5 in the manner illustrated in FIGURE 5, the operation of the hole cutting machine 5 is automatic and continuous. As each of the die support bars 58 passes beneath the platen roll 62, the individual dies carried thereby will engage the undersurface of the web 104 and cooperate with the platen roll 62 to cut the necessary material from the web to form the desired holes. The material cut from the web is drawn down through the bores in the dies and through the waste receptacles carried by the die cutting support bar 13. The waste material is then deposited in a suitable waste receptacle (not shown) by the exhaust line 129.

While one form of the invention has been shown for purposes of illustration, it is to be clearly understood that various changes in the details of construction and arrangement of parts may be made without departing from the spirit and scope of the invention as defined in the appended claims.

I claim:

1. A hole cutting machine comprising a frame, a platen roll, means carried by said frame mounting said platen roll in said frame for rotation, said platen roll having an axis of rotation, an endless conveyor, said conveyor having a run passing said platen roll closely adjacent said platen roll and in a plane disposed parallel to said platen roll axis of rotation, a plurality of die supports carried by said conveyor in spaced relation, a plurality of individual dies carried by each of said die supports with said dies of each of said die supports being spaced longitudinally of said platen roll axis of rotation, said dies being tubular whereby material cut by said dies in cooperation with said platen roll may pass through said dies, a plurality of suction heads, and means rigidly mounting said suction heads in said frame to lie along a plane which passes through said axis of rotation of said platen rolls and through said dies at such time as said dies are in cooperating relation with said platen roll, said suction heads having open ends opposing said platen roll and disposed in a common plane, said die supports having planar surfaces disposed remote from said platen roll at the time said dies are in cooperating relation with said platen roll, said last mentioned plane being coplanar with said planar surfaces of said die supports as said die supports pass said suction heads whereby temporary seals between said suction heads and said die supports and dies are effected during cutting operations and the material removed during the cutting operation drawn into said suction heads.

2. The machine of claim 1 wherein a suction is formed in said suction head by means of a compressed air pipe extending along said suction heads and aspirator connections between said compressed air pipe and ends of said suction heads remote from said suction head open ends.

3. A hole cutting machine comprising a frame, a platen roll, means carried by said frame mounting said platen roll in said frame for rotation, said platen roll having an axis of rotation, an endless conveyor, said conveyor having a straight line run passing said platen roll closely adjacent said platen roll and in a plane disposed parallel to said platen roll axis of rotation, a plurality of die supports carried by said conveyor in spaced relation and at least one die carried by each of said die supports for opposed cooperation with said platen roll, said endless conveyor including a pair of side chains disposed is spaced parallel planes, a drive shaft having spaced drive sprockets thereon and an idler shaft having spaced idler sprockets thereon, said chains extending between and being entrained over respective ones of said drive sprockets and said idler sprockets, mounting means mounting said drive shaft in said frame for rotation, and other mounting means mounting said idler shaft in said frame for rotation and for movement towards and away from said drive shaft whereby the lengths of said side chains and the number of said die supports may be varied, said other mounting means including a pair of support plates, means carried by said frame for fixedly mounting said support plates on opposite sides of said frame in selected positions and in alignment with each other, a pair of bearing assemblies, and means adjustably mounting said bearing assemblies on said support plates for limited relative adjustment, the last mentioned means including a pair of feed screws fixedly carried by said frame for rotation and threadedly engaged with respective ones of said bearing assemblies, and drive means connected to said feed screws for simultaneously driving said feed screws and moving said bearing assemblies relative to said frame like distances.

4. A hole cutting machine for cutting very thin sheet material comprising a frame, a hard surface platen roll, means carried by said frame mounting said platen roll for rotation, said platen roll having an axis of rotation, a plurality of die supports, means carried by said frame mounting said die supports for movement in a plane disposed parallel to said axis when said die supports are adjacent said platen roll, a die carried by each of said die supports for movement tangentially to the peripheral surface of said platen roll with zero clearance between each die and said hard surface platen roll, first back-up means for engaging each die support as the respective one of said dies engage said platen roll, and second back-up means engaging the peripheral surface of said platen roll in direct opposed relation to said first back-up means to prevent the upward deflection of the platen roll during the die cutting operation, said die supporting means comprising an endless conveyor including a pair of side chains disposed in spaced parallel planes, said die supports extending between said side chains and being connected thereto, a drive shaft having spaced drive sprockets mounted thereon and an idler shaft having spaced idler sprockets mounted thereon, said chains extending between and being entrained over respective ones of said drive sprockets and said idler sprockets, mounting means mounting said drive shaft in said frame for rotation, and other mounting means mounting said idler shaft in said frame for rotation and for movement toward and away from said drive shaft whereby the number of said die supports may be varied.

5. The hole cutting machine as defined by claim 4 wherein said other mounting means includes a pair of support plates, means carried by said frame for fixedly mounting said support plates on opposite sides of said frame in selected positions and in alignment with each other, a pair of bearing assemblies, and means adjustably mounting said bearing assemblies on said support plates for limited relative adjustment, the last mentioned means including a pair of feed screws fixedly carried said frame for rotation and threadably engaged with respective ones of said bearing assemblies, and drive means connected to said feed screws for simultaneously driving said feed screws and moving said bearing assemblies relative to said frame like distances.

6. The hole cutting machine of claim 5 wherein said support plates have upper and lower slots longitudinally disposed therethrough, and said mounting means for said support plates comprises screws threadably engaged in opposite sides of said frame through said slots whereby said bearing assemblies connected to said support plates may be longitudinally moved the full extent of said slots upon loosening said screws in each selected position of said support plates.

References Cited in the file of this patent

UNITED STATES PATENTS

| | | |
|---|---|---|
| 1,093,380 | Brach | Apr. 14, 1914 |
| 1,666,203 | Harshberger | Apr. 17, 1928 |
| 1,922,248 | Kelly | Aug. 15, 1933 |
| 2,271,459 | McConnell | Jan. 27, 1942 |
| 2,323,644 | Castellan | July 6, 1943 |
| 2,338,327 | Haegele | Jan. 4, 1944 |
| 2,522,154 | Asmussen | Sept. 12, 1950 |
| 2,547,157 | Gibbons | Apr. 3, 1951 |
| 2,707,922 | Ferguson | May 10, 1955 |
| 2,760,576 | Spencer | Aug. 28, 1956 |
| 2,787,323 | Van Antwerpen | Apr. 2, 1957 |
| 2,791,276 | Weller | May 7, 1957 |